US008526168B2

(12) United States Patent
Daly

(10) Patent No.: US 8,526,168 B2
(45) Date of Patent: Sep. 3, 2013

(54) POWER OUTLET BOX FOR ELECTRONIC DISPLAYS IN A RETAIL ENVIRONMENT

(76) Inventor: Peter Daly, Yorktown Heights, NY (US)

(*) Notice: Subject to any disclaimer, the term of this patent is extended or adjusted under 35 U.S.C. 154(b) by 241 days.

(21) Appl. No.: 13/117,919

(22) Filed: May 27, 2011

(65) Prior Publication Data

US 2012/0176733 A1 Jul. 12, 2012

Related U.S. Application Data

(60) Provisional application No. 61/348,784, filed on May 27, 2010.

(51) Int. Cl.
*H02B 1/26* (2006.01)
*H02B 1/30* (2006.01)
*H01J 5/00* (2006.01)
*H02G 13/00* (2006.01)

(52) U.S. Cl.
USPC .......... 361/622; 174/50; 174/61; 174/62; 174/63; 174/64

(58) Field of Classification Search
None
See application file for complete search history.

(56) References Cited

U.S. PATENT DOCUMENTS

| | | | | |
|---|---|---|---|---|
| 4,976,633 A * | 12/1990 | Beghelli | | 439/571 |
| 5,434,356 A * | 7/1995 | Zekowski | | 174/481 |
| 6,417,446 B1 * | 7/2002 | Whitehead | | 174/484 |
| 6,770,811 B1 * | 8/2004 | Gretz | | 174/50 |
| 6,827,229 B2 * | 12/2004 | Dinh et al. | | 220/3.3 |
| 6,930,250 B1 * | 8/2005 | Drane | | 174/58 |
| 6,956,170 B1 * | 10/2005 | Gretz et al. | | 174/58 |
| 7,232,336 B1 * | 6/2007 | Evans | | 439/535 |
| 7,518,852 B2 * | 4/2009 | Kondas | | 361/622 |
| 7,855,548 B2 * | 12/2010 | Engel | | 324/156 |
| 8,303,336 B2 * | 11/2012 | Smith | | 439/529 |

* cited by examiner

*Primary Examiner* — Boris Chervinsky

(57) ABSTRACT

A power outlet box for housing electronics and powering electronic displays suspended in a retail environment may include a first housing portion including a first set of vertical support features and a second set of vertical support features. A second housing portion may include a third set of vertical support features and a fourth set of vertical support features. The power outlet box may have (i) a closed configuration when the first and third sets of vertical support features are aligned and (ii) an open configuration when the second and fourth set of vertical support features are in contact with one another. The second set of vertical support features may be adapted to support the fourth set of vertical support features when the power outlet box is in the open configuration. A power supply device may be fixedly positioned within the power outlet box when in the closed configuration.

16 Claims, 13 Drawing Sheets

POWER OUTLET BOX FOR ELECTRONIC DISPLAYS IN A RETAIL ENVIRONMENT

RELATED APPLICATIONS

This Patent Application claims priority to co-pending U.S. Provisional Patent Application Ser. No. 61/348,784 filed May 27, 2010, the entire contents of which are herein incorporated by reference in their entirety.

BACKGROUND

Advertising messaging in retail stores has traditionally been performed using paper advertisements. These paper advertisements, however, are generally understood to be promotional advertisements. Over the past couple of decades, attempts have been made to leverage electronic displays to deliver video advertising to shoppers within retail stores. Over the years, electronic displays have been used to present video messaging in retail stores. There have been a number of different configurations of electronic displays or what has been traditionally known as digital out-of-home media or dynamic signage. For example, electronic displays may be mounted at cash registers, on store shelves, on walls, from ceilings, and so on.

In some cases, electronic displays are positioned in store aisles because shoppers are limited to traversing in a linear manner (i.e., one direction or the other). To ensure that shoppers traveling in either direction can view the video content, the electronic displays have been placed back-to-back to ensure shoppers can view the content traveling in either direction. Wander areas or non-linear travel departments, such as produce sections in grocery stores, however, allow shoppers free movement in nearly any direction. In these wander areas, placing electronic displays facing opposite directions (i.e., back-to-back) does not guarantee that the electronic displays will be positioned in the line-of-sight of shoppers who travel in a linear or non-linear manner through the wander area. Furthermore, as some store layouts, such as mass merchants, have significant portions of the store configurations set up as wander areas, the ability to ensure that substantially every shopper has the ability to view an electronic display as they traverse through the wander areas becomes very difficult.

Support fixtures for electronic displays can be large and expensive, both in terms of cost of the fixture itself and cost for installation. For example, large format televisions (e.g., 30-inches or larger), which have traditionally be hung from retail store ceilings, require sturdy support fixtures to support the weight of the televisions, especially if two are placed back-to-back. To install the support these fixtures, as a result of the weight and complexity of electrical and communications wiring, multiple people are required to perform the installation. In most cases, the electrical work is custom due to the support fixtures not accommodating the myriad of electrical wiring configurations required for diverse field installations.

SUMMARY

To ensure that shoppers within a wander area of retail stores have the ability to view an electronic display as they travel through the wander area, the principles of the present invention provide for a multi-view display cluster including at least three electronic displays. Depending on the configuration of the wander area, the electronic displays in the multi-view display cluster may be oriented such that shoppers traveling through the wander area have an opportunity to view an electronic display regardless of the direction of travel. In one embodiment, a fixture extending from a ceiling may be configured with at least three electronic displays facing different angular directions. For example, if three electronic displays are used, then relative angles in which the electronic displays are directed may be 120 degrees. However, depending upon the position of the multi-view display, the relative angles between the displays forming the multi-view display cluster may be non-uniform. For example, if a multi-view display cluster is configured with three electronic displays, the relative angles between the electronic displays may be other than 120 degrees.

Furthermore, to better ensure that a shopper traveling through the wander area has an opportunity to view a display, the multi-view display cluster may be positioned above goods being offered for sale (e.g., display of fruit) so that as shoppers approach the goods being offered for sale, the shoppers have an opportunity of viewing one of the electronic displays in the multi-view display cluster. In addition, by positioning the multi-view display cluster above a product display, shoppers will not be able to walk directly below the multi-view display cluster, thereby maximizing the ability for shoppers to view an electronic display of the multi-view display cluster and reduce the ability for shoppers to damage the electronic displays either intentionally or unintentionally. However, whether or not the content features products that may be nearby, the multi-view display delivers maximum viewing in the wander area to shoppers of all advertisements and messages. Each display in the multi-view display clusters may be directed toward pathways, if any, that lead toward the multi-view display cluster. In one embodiment, to reduce background visual "noise," a border area may extend radially outward from each electronic display. In addition, the border area may be a "flat" color (e.g., brushed silver) so that the images displayed on the electronic displays stand out from any objects behind the electronic displays, thereby causing a shopper's attention to be focused on the content rather than objects behind the display.

The electronic displays in the multi-view display cluster may be relatively small (e.g., 13-inch diagonal displays) to be light weight, thereby enabling a fixture assembly used to support the electronic displays to also be light weight, relatively simple in design, and inexpensive to manufacture and install. In one embodiment, extension arms used to support the electronic displays may be formed of a light weight material, such as sheet metal, thereby making the overall weight of the multi-view display cluster cost effective and light weight.

One embodiment of a multi-view electronic display fixture assembly may include a support extension member defining an axis extending longitudinally through the support extension member. At least three extension arms may be configured to (i) be supported by the support extension member when extended from a ceiling and (ii) extend outward from the extension member. The at least three extension members may further be configured to be independently rotatable about the axis. Mounting structures may be positioned at an end of the at least three extension arms opposite from the support extension member from which the at least three extension arms are supported. The mounting structures may be configured to respectively support electronic display devices.

A system and method configuring an electronic fixture display assembly may include providing a support extension member. At least three extension arms may be supported from the support extension member, where the at least three extension arms may be configured (i) to support respective electronic displays, and (i) to be rotatably positionable relative to the support extension member.

One embodiment of a method for installing a multi-view display cluster in a retail environment may include connecting a safety tether to a joist that supports a ceiling of a building. A bracket connected to the safety tether may be mounted to a suspended ceiling support. The mounting may include placing ends of the bracket on top of the suspended ceiling support (e.g., across two individual suspended ceiling supports). The bracket may include an electrical box connected thereto. An opening in a member of the dropped ceiling may be created if one does not exist. An the electrical outlet box may be aligned with the an opening in the suspended ceiling. The electrical outlet box may be configured to provide power to at least three electronic displays of the multi-view display cluster. Electrical conductors may be electrically connected from the electrical box to a power supply in a power outlet box of the multi-view display cluster. The power outlet box may be mechanically connected to the electrical box, where the power outlet box may be aligned with and positioned below the opening in the suspended ceiling. A support extension member may be supported from the electrical outlet box. At least two electrical conductors may be connected to an output of the power outlet box. A display mounting bracket may be suspended from the extension support member, where the display mounting bracket may be configured to support at least three electronic displays. The at least three electronic displays may be connected to the display mounting bracket if not already connected. The at least two electrical conductors may be electrically connected to the at least three electronic displays.

One embodiment of a power outlet box for housing electronics and powering electronic displays suspended in a retail environment may include a first housing portion including a first set of vertical support features and a second set of vertical support features. A second housing portion may include a third set of vertical support features and a fourth set of vertical support features. The power outlet box may have (i) a closed configuration when the first and third sets of vertical support features are aligned and (ii) an open configuration when the second and fourth set of vertical support features are in contact with one another. The second set of vertical support features may be adapted to support the fourth set of vertical support features when the power outlet box is in the open configuration. A power supply device may be fixedly positioned within the power outlet box when in the closed configuration.

One embodiment of a method for installing a power outlet box for powering an electronic display device being suspended from the power outlet box may include suspending the power outlet box from a ceiling, where the power outlet box includes multiple portions. The power outlet box may be opened to be in an open configuration. The open configuration may be maintained by a first portion of the power outlet box gravitationally supporting a second portion of the power outlet box so as to enable a user to work within the power outlet box. The power outlet box may be electrically connected to a power source to power a power supply fixedly attached within the power outlet box. The electronic display may be electrically connected to the power supply. The power outlet box may be closed to be in a closed configuration. The electronic display device may be suspended from the power outlet box.

One method for generating media metrics in a retail environment may include arranging multiple electronic displays along aisles of a retail environment, and arranging at least one multi-view electronic display cluster including at least three electronic displays in at least one wander area of the retail environment. The electronic displays arranged along the aisles and wander area may be arranged to present a shopper during a shopping trip in the retail environment with each message among multiple repeating messages displayed substantially simultaneously on the electronic displays a predicted number of multiple times. The predicted number of multiple times may be three. Arranging the electronic displays in the aisles and electronic displays of the multi-view electronic display cluster may include arranging the electronic displays at substantially the same height above a floor of the retail environment.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1A:
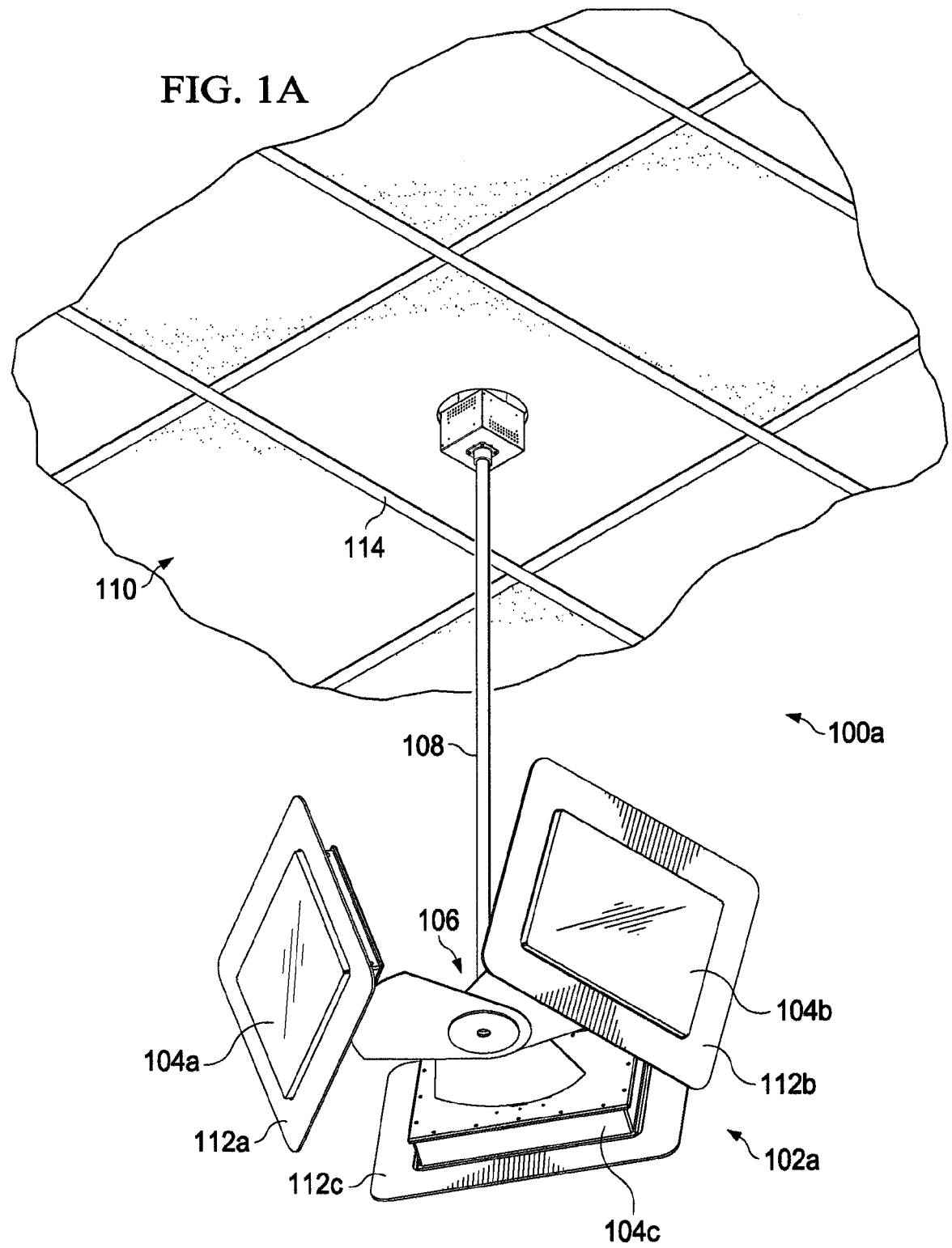
FIGS. 1A and 1B are illustrations of a retail environment in which illustrative multi-view display clusters respectively including three and five electronic displays for display of content.

With regard to FIG. 1A, an illustration of a retail environment 100a in which an illustrative multi-view display cluster 102a is shown. The multi-view display cluster 102a includes three electronic displays 104a-104c (collectively 104) that are angled at different planar angles relative to a center axis between the electronic displays. The electronic displays 104 are mounted to and supported by a multi-view electronic display fixture assembly 106 ("multi-view fixture"). In one embodiment, the multi-view fixture 106 may be configured to provide for positionable angles, such that the electronic displays may be individually rotated or otherwise positioned around the center axis defined by a support extension member 108. By the electronic displays being individually positionable, a retailer or network manager may adjust position of the electronic displays 104 during installation to maximize view angles of the electronic displays 104 by shoppers who are traveling through a wander area or non-linear travel department. Alternatively, the multi-view fixture 106 may have continuous rotation ability around the center axis or have fixed angular positions at which the electronic displays 104 may be set.

Figure 1B:
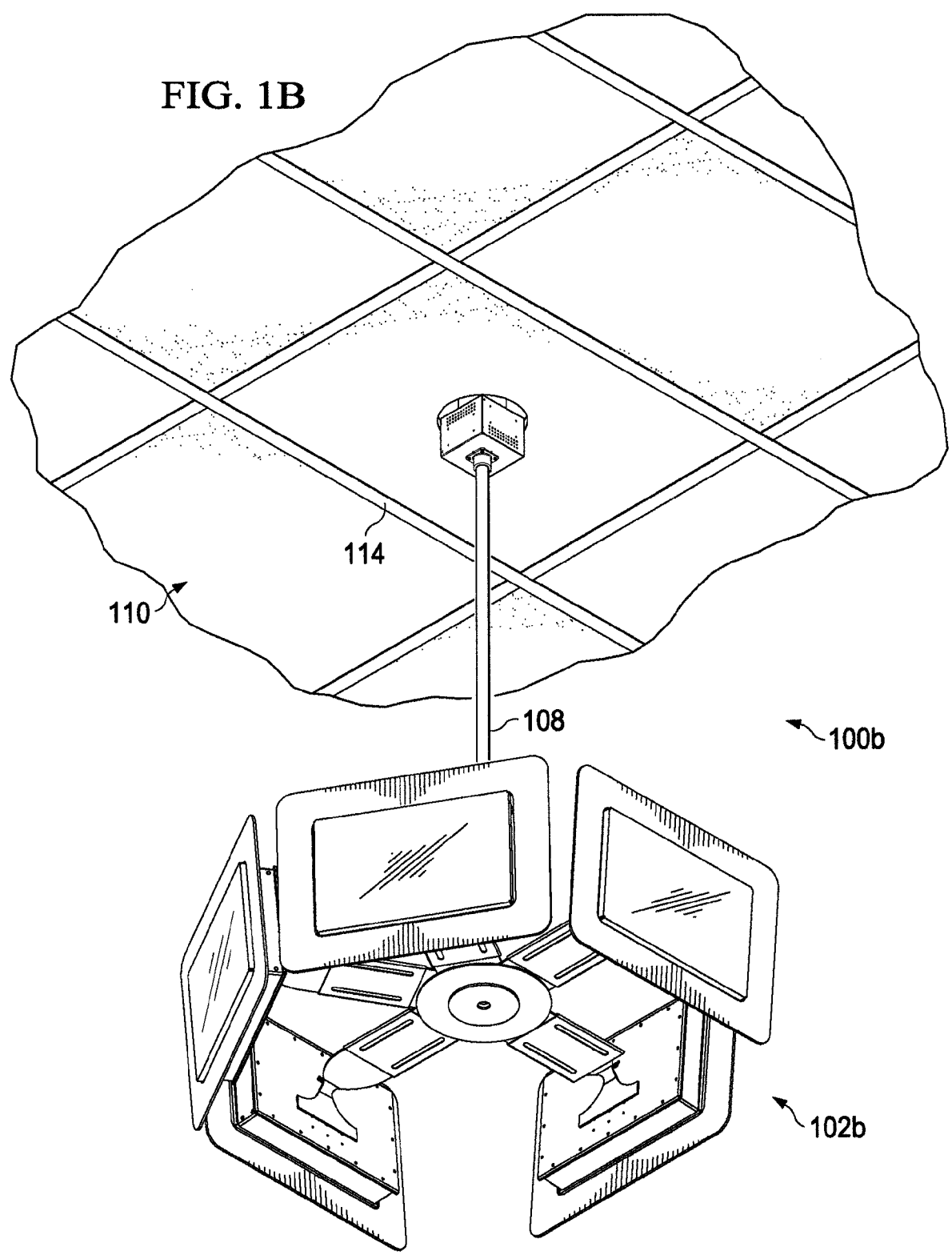

The electronic displays 104, as shown, may have border areas 112a-112c (collectively 112) that extend radially outward from the electronic displays 104 so as to frame or border the images on the electronic displays 104 and reduce visual "clutter" or "noise" beyond the electronic displays 104 when viewed from the front. The border areas 112 may be a "flat" color, such as brushed silver or any other color, which enables a shopper to focus his or her attention on the content being displayed on the electronic displays 104. Although the electronic display cluster 102 is shown to include three electronic displays 104 extending from a center axis, the principles of the present invention provide for more than three electronic displays, such as five, as shown in the retail environment 100b of FIG. 1B with the multi-view fixture 102b.

The support extension member 108 (e.g., hollow pole) may extend from power outlet box (not shown) that is mounted to or supported by a bracket, which may include an electrical box (see FIGS. 2A-2B), extending through the suspended ceiling 110. In one embodiment, the bracket may be a conventional bracket that is connected to the suspended ceiling 110 by attaching to T-channels or J-channels 114 of the suspended ceiling 110 and secured by chains to a joist (not shown) above the suspended ceiling 110, as understood in the art. The support extension member 108 may both structurally support the multi-view display cluster 102 by attaching to the bracket and power the electronic displays 104 using electrical conductors, such as wires, that carry electrical power to the electronic displays.

Figure 2A:
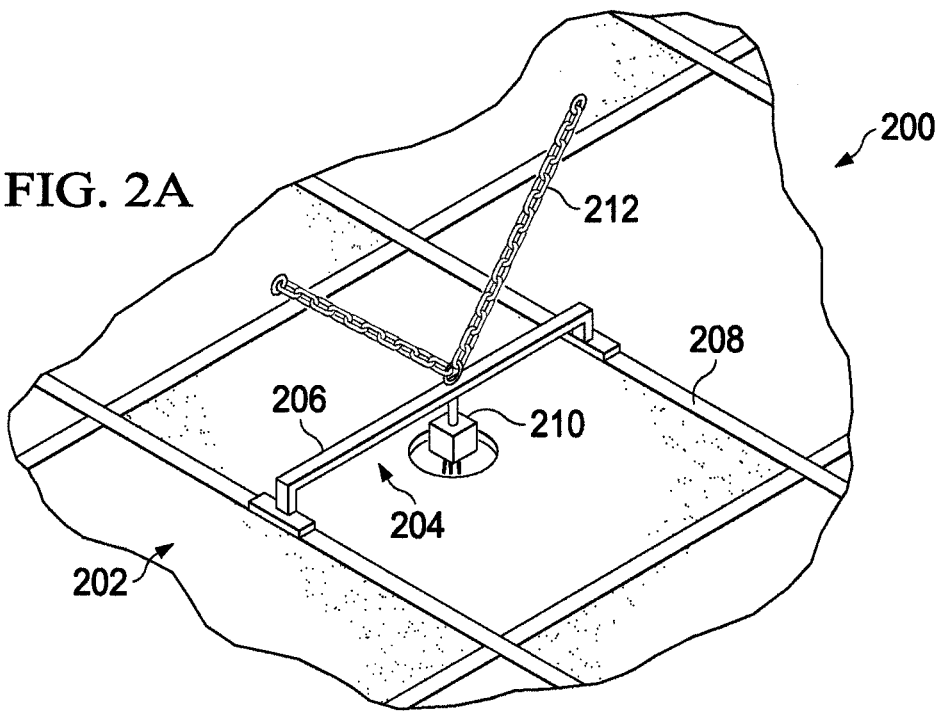
FIG. 2A is an illustration of a retail environment from a perspective above a suspended ceiling with an illustrative display bracket used for supporting a multi-view display cluster is shown.

With regard to FIG. 2A, an illustration of a retail environment 200 from a perspective above a suspended ceiling 202 with an illustrative support bracket 204 used for supporting a multi-view display cluster is shown. The display bracket 204 may be a conventional support bracket that is used for suspending ceiling fans and lighting. In one embodiment, the support bracket 204 may be an Arlington Industries support bracket with model number FS420SCL. As shown, the support bracket 204 may include a bracket member 206 that spans across and is supported by a suspended ceiling grid 208. The support bracket 204 may include an electrical box 210 that is configured to provide strain relief to electrical conductors (e.g., wires) (see FIG. 2B) that receive electrical power via store electrical power lines (not shown). As understood in the art, the support bracket 204 includes a safety tether 212, such as a heavy-duty chain, that is wrapped around a ceiling or roofing joist (not shown). It should be understood that alternative support brackets may be utilized in accordance with the principles of the present invention.

With regard to FIG. 2B, an illustration of the retail environment from a perspective below the suspended ceiling 202 of FIG. 2A is shown. The suspended ceiling 202 is shown to include ceiling tiles 202a-202n (collectively 202). Ceiling tile 202e is shown to have an opening 214 created therein so that the electrical box 210 may be exposed. Electrical conductors 216 that extend through and are supported by the electrical box 210 may be connected to a power conductor in a power outlet box, as further described herein, to power electronic displays of a multi-view display cluster. The electrical box 210 may also be used to support the multi-view display cluster by connecting the power outlet box directly to the electrical box 210 using fastening hardware (e.g., screws). Because the multi-view display cluster is relatively light weight due to the electronic displays and support hardware or multi-view fixture being light weight, such a support configuration may be achieved. And, because the support bracket configuration is relatively standard (e.g., a similar configuration is used for ceiling fans and lighting), installation time and cost is low as compared to installation of large format electronic displays.

Figure 2B:
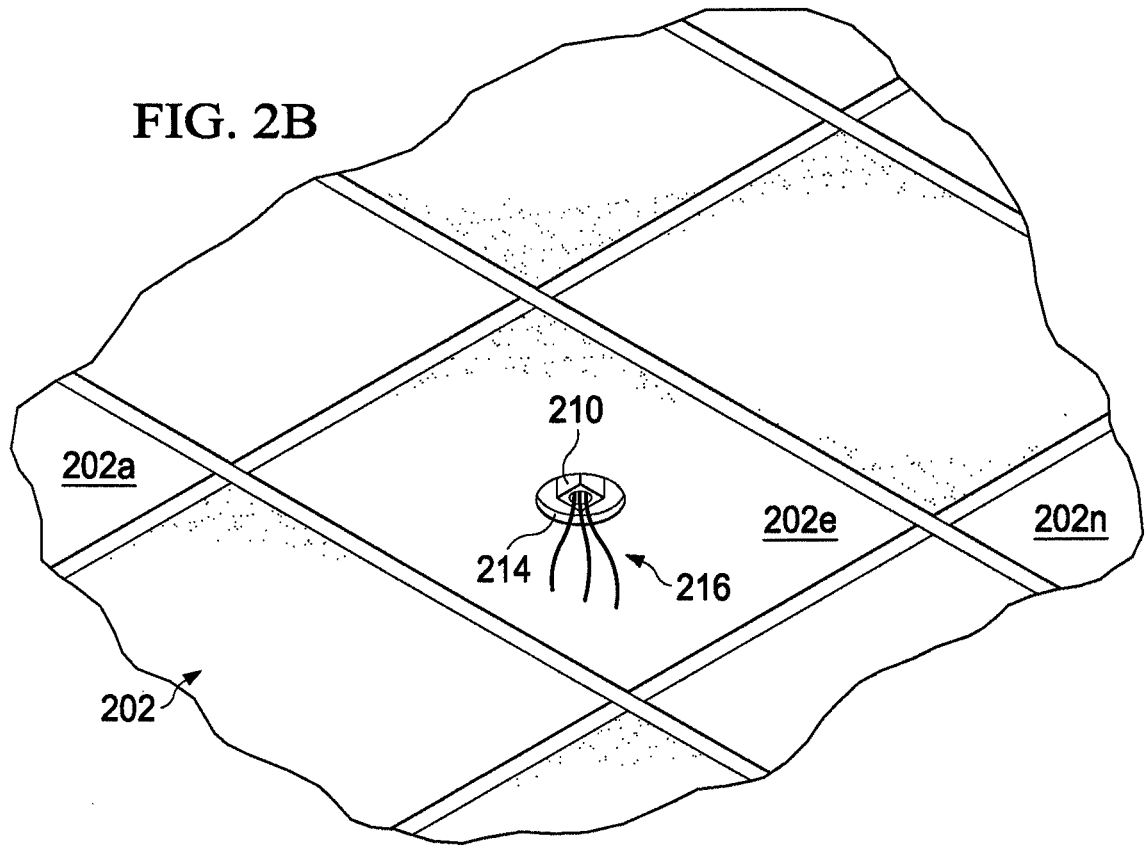
FIG. 2B is an illustration of the retail environment from a perspective below the suspended ceiling of FIG. 2A is shown.
Figure 3:
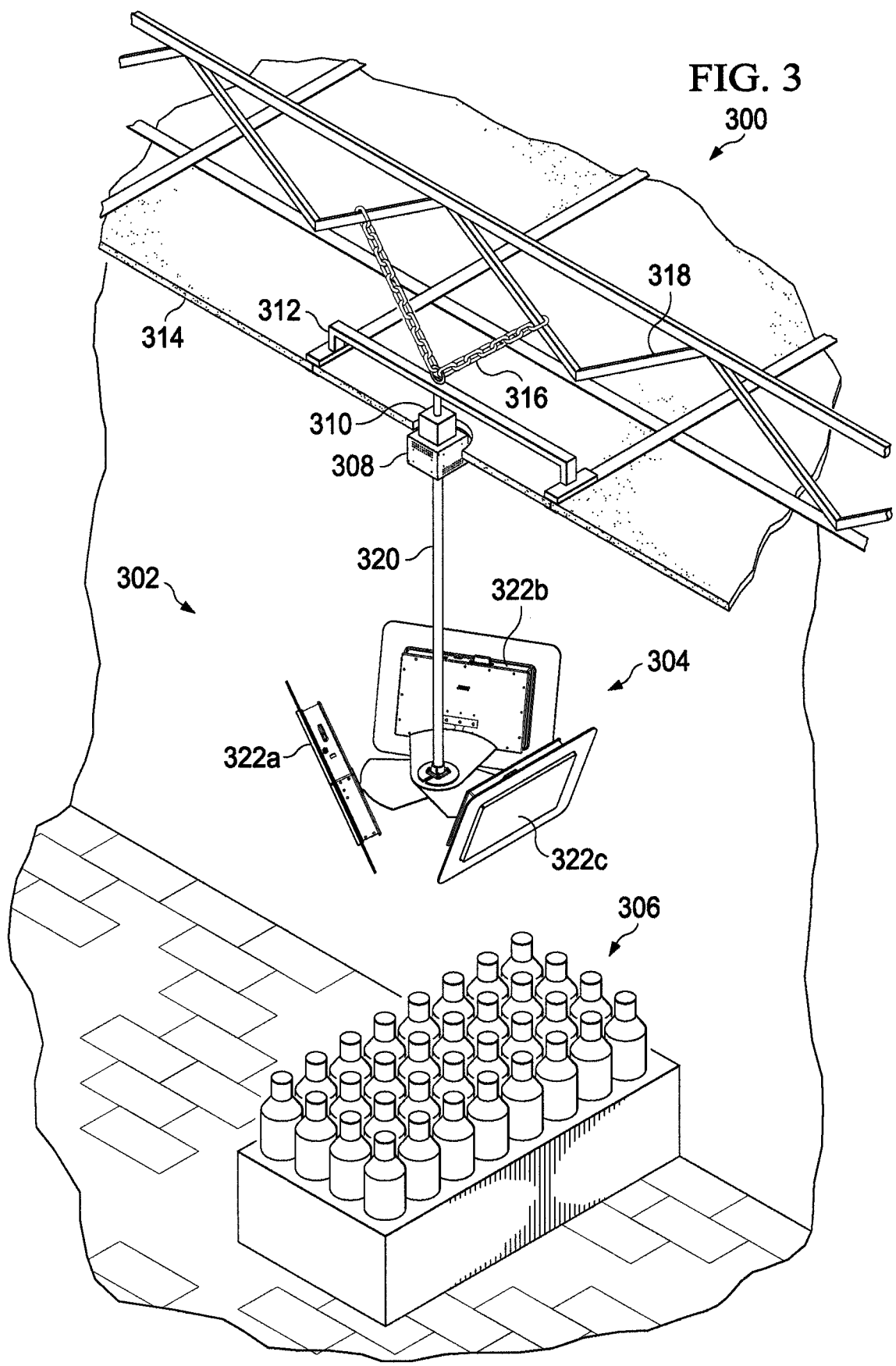
FIG. 3 is an illustration of an illustrative retail environment with a wander area in which a multi-view display cluster is shown.

With regard to FIG. 3, an isometric view of an illustrative retail environment 300 with a wander area 302 in which a multi-view display cluster 304 is shown. A product display 306 is shown to have the multi-view display cluster 304 suspended thereabove. In an alternative embodiment, the multi-view display cluster 304 may be suspended over walk areas. The multi-view display cluster 304 may be supported by a power outlet box 308 connected to an electrical box 310 supported by a bracket member 312 that is positioned above a suspended ceiling 314, as described with regard to FIGS. 2A and 2B. The bracket member 312 may include a safety tether 316 that connects to joist(s) 318 that support the suspended ceiling 314 or roof to prevent the multi-view display cluster 304 from falling.

In one embodiment, the power outlet box 308 may be configured to include two substantially reciprocal portions of a box, including an upper box and a lower box, as shown further herein. In one embodiment, a support extension member 320, such as a hollow tube, may extend from the power outlet box 310 to the multi-view display cluster 304 to (i) support the multi-view display cluster 304 and (ii) provide power to electronic displays 322a-322c (collectively 322) via conductive wires (not shown) that may extend through the support extension member 320 from output terminals (not shown) of the power outlet box 308. That is, a power supply (not shown) housed in the power outlet box 308 may convert and/or condition power received from the electrical system of the retail store and provide conditioned power to the electronic displays 322. It should be understood that communication cables and wires may also be routed via the support extension member 320.

Figure 4:
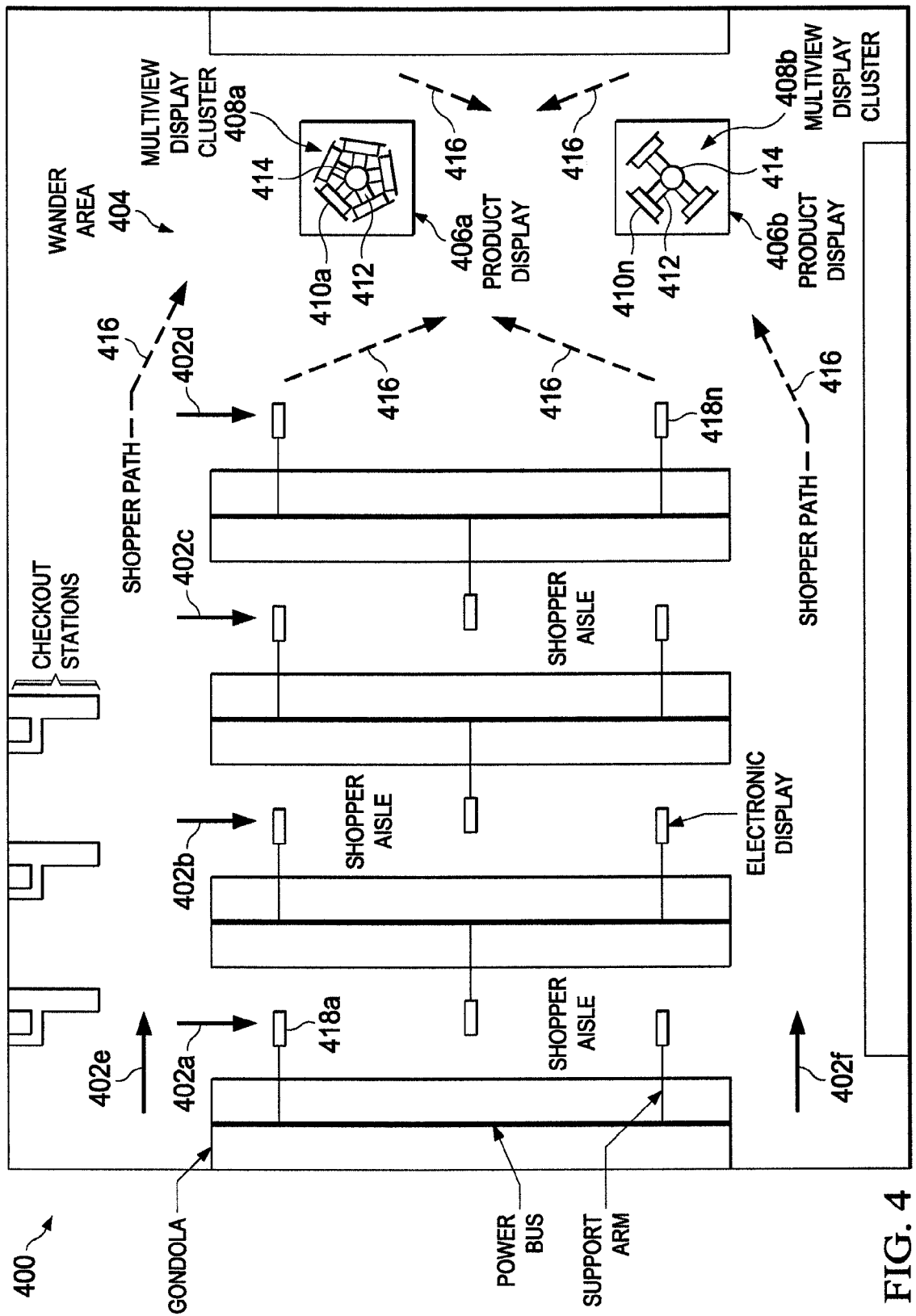
FIG. 4 is an illustration of an illustrative retail store having shopper aisles and a wander area in which one or more multi-view display clusters may be positioned.

With regard to FIG. 4, a top view illustration of an illustrative retail store 400 having shopper aisles 402a-402f (collectively 402) and a wander area 404 is shown. The wander area 404 may include one or more product displays 406a-406b (collectively 406) on which products (e.g., vegetables, fruits, etc.) are presented to shoppers for purchase. Above the product displays 406 may be multi-view display clusters 408a and 408b (collectively 408) that are configured in a "hub and spoke" configuration. As shown, multi-view display cluster 408a includes five electronic displays and multi-view display cluster 408b includes three electronic displays. It should be understood that each may have the same or different number, and that the determination for how many electronic displays may be based on shopper path measurement metrics and other factors, as further described herein. Electronic displays 410a-410n (collectively 410) may be connected to the end of spokes or extension arms 412 being supported by hubs or support extension members 414. The extension arms 412, as previously described, may be configured to enable the electronic displays 410 to be rotated or positioned at different angles or planar orientations relative to the support extension members 412 to enable shoppers to view the associated electronic displays as the shoppers travel toward the product display from any direction. Adjustable brackets or hinges (not shown) may be positioned on the end of the extension arms 412 are attached to enable the electronic displays 410 to be adjusted in elevation and/or azimuth angles. By being able to adjust horizontal, azimuth, and elevation angles, shoppers traveling toward the product displays 406 via shopper paths 416 may view the electronic displays 410 in a substantially perpendicular manner. As the electronic displays 410 may have a wide viewing angle, a shopper does not have to be directly perpendicular from the electronic displays 410 to be able to adequately view content being displayed thereon. It should be understood that multi-view display clusters may not be positioned over each product display and still have the ability for a certain percentage of shoppers to have an opportunity to view each advertisement or message being displayed on the electronic display network a predetermined number of times, as further described herein and in co-pending U.S. patent application Ser. No. 12/368,232, which is incorporated herein by reference in its entirety.

The electronic displays 410 that are suspended in the wander area 404 may be positioned at substantially the same height from the floor as electronic displays 418a-418n within the aisles 402. By positioning the electronic displays 410 and 418 at substantially the same height, shoppers who are in either the aisles 402 or wander area 404 may become accustomed to observing, either actively or passively, content being displayed on the electronic displays 410 and 418. In terms of being substantially the same height, the electronic displays 410 and 418 may be offset by a few inches without being noticeable to a shopper.

Multi-View Electric Display Fixture Assembly

Figure 5:
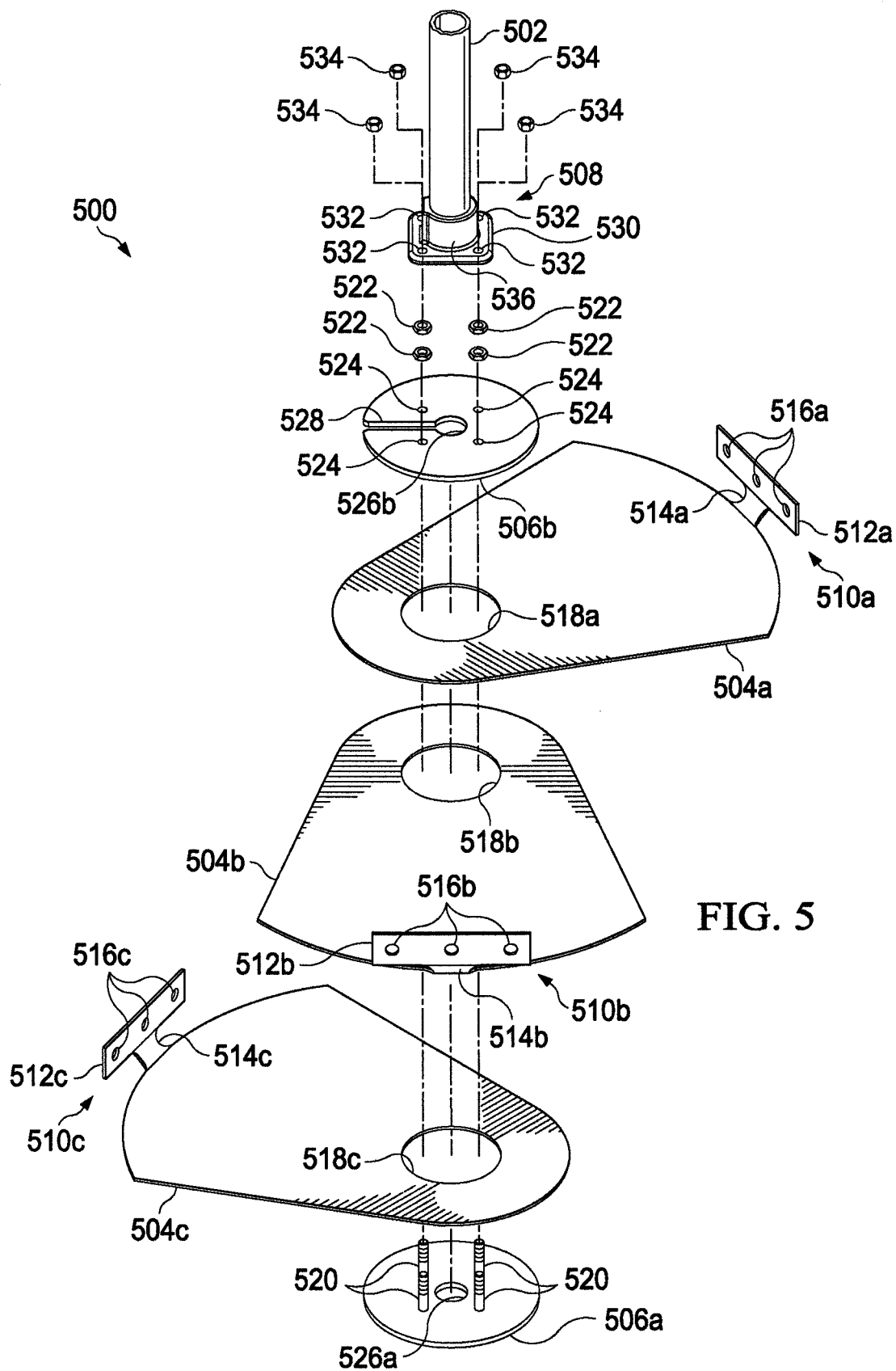
FIG. 5 is an exploded view illustration of an illustrative multi-view display fixture assembly configured to support three electronic displays.

With regard to FIG. 5, an exploded view illustration of an illustrative multi-view display fixture assembly 500 is shown. The multi-view display fixture assembly 500, when supporting electronic displays, is considered a multi-view display cluster, as previously shown and described. The multi-view display fixture assembly 500 includes a support extension member 502 and may include three or more extension arms, in this case three extension arms 504a-504c (collectively 504). The support extension member 502 may be formed of a stiff material, such as metal or plastic, and have an opening extending axially therethrough to enable electrical conductors, such as wires, to extend through the opening. The support extension member 502 may be a tube, as understood in the art.

The extension arms 504 may be supported by the support extension member 502 by using extension arm clamp plates 506a and 506b (collectively 506) in combination with an extension arm clamp bracket 508. The extension arms 504 are shown to extend radially from the support extension member 502. It should be understood that alternative configurations of the extension arms 504 may be utilized, such has sloping, curving, or having an alternative shape. The clamp plates 506 and clamp bracket 508 may be configured to clamp the extension arms 504 with enough force to support the extension arms 504 while providing for the extension arms 504 to rotate. In the instant configuration, the extension arms 504 rotate about an axis defined by the support extension member 502. Alternative repositionable or adjustable configurations may be utilized in accordance with the principles of the present invention.

Each of the extension arms 504 are shown to include respective mounting structures 510a-510c (collectively 510) that are used to mount and support electronic displays. The mounting structures 510 may include bracket portions 512a-512c (collectively 512) and coupling portions 514a-514c (collectively 514). Openings 516a-516c may be utilized in combination with fastening hardware (e.g., screws) to connect the electronic displays to the mounting structures 510. The configuration and material of the coupling portions 514 may allow for electronic displays mounted to the bracket portions 512 to be adjusted in azimuth (i.e., rotated side to side) and elevation (i.e., rotated up and down) orientations. In one embodiment, the extension arms 504 and mounting structures 510 may be formed from a single piece of material, such as sheet metal or cold rolled sheet steel (e.g., cold rolled sheet steel 10 ga, 16 ga, or otherwise), as understood in the art. Depending on the weight of the electronic display that the extension arms are to support, the thickness of the material may increase or decrease to maximize cost efficiency and prevent or minimize bending or distortion over time. If sheet metal or comparable metal or material is used, then the mounting structures may be adjusted in azimuth and elevation by simply bending or twisting the coupling portions 514. Because no fastening members are utilized to adjust orientation of the electronic displays, the cost of production is essentially the cost to cut (e.g., laser cut) or stamp the part, as no additional parts (e.g., fastening hardware, hinges, joints, etc.) are utilized, thereby making the extension arms 504 very cost effective (e.g., a few dollars). The coupling portions 514 may be machine bent at a pre-set angle or bent during installation at a retail store. It should be understood that alternative configurations of mounting structures may be utilized in accordance with the principles of the present invention and provide for the same or similar functionality, including affixing separate mounting structures to the extension arms 504.

As further shown, the extension arms 504 define openings 518a-518c (collectively 518) at an end opposite that of the mounting structures 510. The openings 518 provide for the extension arm clamp plates 506 to fasten to one another and revolve around fastening members used by the clamp plates 506, as described below.

Extension arm clamp plate 506a is shown to include multiple fastening members 520 that extend perpendicularly from the clamp plate 506a. The fastening members 520 may be studs, such as threaded studs or PEM studs, and be partially threaded or have other fastening features that enable reciprocal fastening members 522, such as threaded nuts or PEM nuts, to engage and secure to the fastening members 520. Once fastened, the extension arms 504 are sandwiched between the clamp plates 506. As shown, clamp plate 506b defines openings 524 through which the fastening members 520 extend. Both of the clamp plates 506 define openings 526a and 526b through which the support extension member 502 may extend, if desired. The clamp plate 506b may further define a slot or channel 528 that extends completely or partially through the clamp plate 506b, thereby enabling conductors, such as wires, to be routed between the extension arm 504a and clamp bracket 508 when the fixture assembly 500 is assembled. Alternatively, rather than the clamp plate 506b including a channel 528, the support extension member 502 may define an opening (not shown) just above the clamp bracket 508 to enable conductors to exit so as to be more aesthetically pleasing than running down the outside length of the support extension member 502.

The clamp bracket 508 may include a base portion 530 that defines openings 532 that are aligned with the openings 524 and fastening members 520. The openings 532 may enable the fastening members 520 or a portion thereof to extend therethrough. Fastening members 534 may be connected to the fastening members 520, thereby securing the clamp bracket 508. The clamp bracket 508 may include a flange 536 that provides for engaging the support extension member 502. In one embodiment, the flange 536 may be configured to be capable of being crushed or bent, thereby providing for clamping of the support extension member 502. Alternatively and/or additionally, flange 536 and support extension member 502 may define openings (not shown) through which a set screw or pin, such as a clevis pin, may pass and secure and prevent substantial relative movement between the clamp bracket 508 to the support extension member 502. As a result, the clamp plates 506 may be fixed in position relative to the support extension member 502, while the tension applied to the clamp plates 506 that sandwich the extension arms 504 allows for individual rotation of the extension arms 504. As a result, a user may individually adjust electronic displays about an axis defined by the support extension member 502, in an azimuth plane, and in an elevation plane, thus providing for adjustment with four degrees of freedom.

Although the extension arms 504 are shown to be wedge shaped, it should be understood that alternative shapes may be utilized in accordance with the principles of the present invention. In this case, the wedge shape actually reduces the amount of material and cost used to support the electronic display. For example, if a 13-inch electronic display is used, then the dimensions of the extension arms tend to be longer and wider to provide sufficient angular distance between two electronic displays. If smaller electronic displays are used, then the extension arms may be shorter in length, thereby using a smaller amount of material. A variety of factors may be utilized to determine size and shape of the extension arms 504, which may be more suitably termed rotation or adjustment arms as some extension arms may be circular and, therefore, not extend per se.

Figure 6:
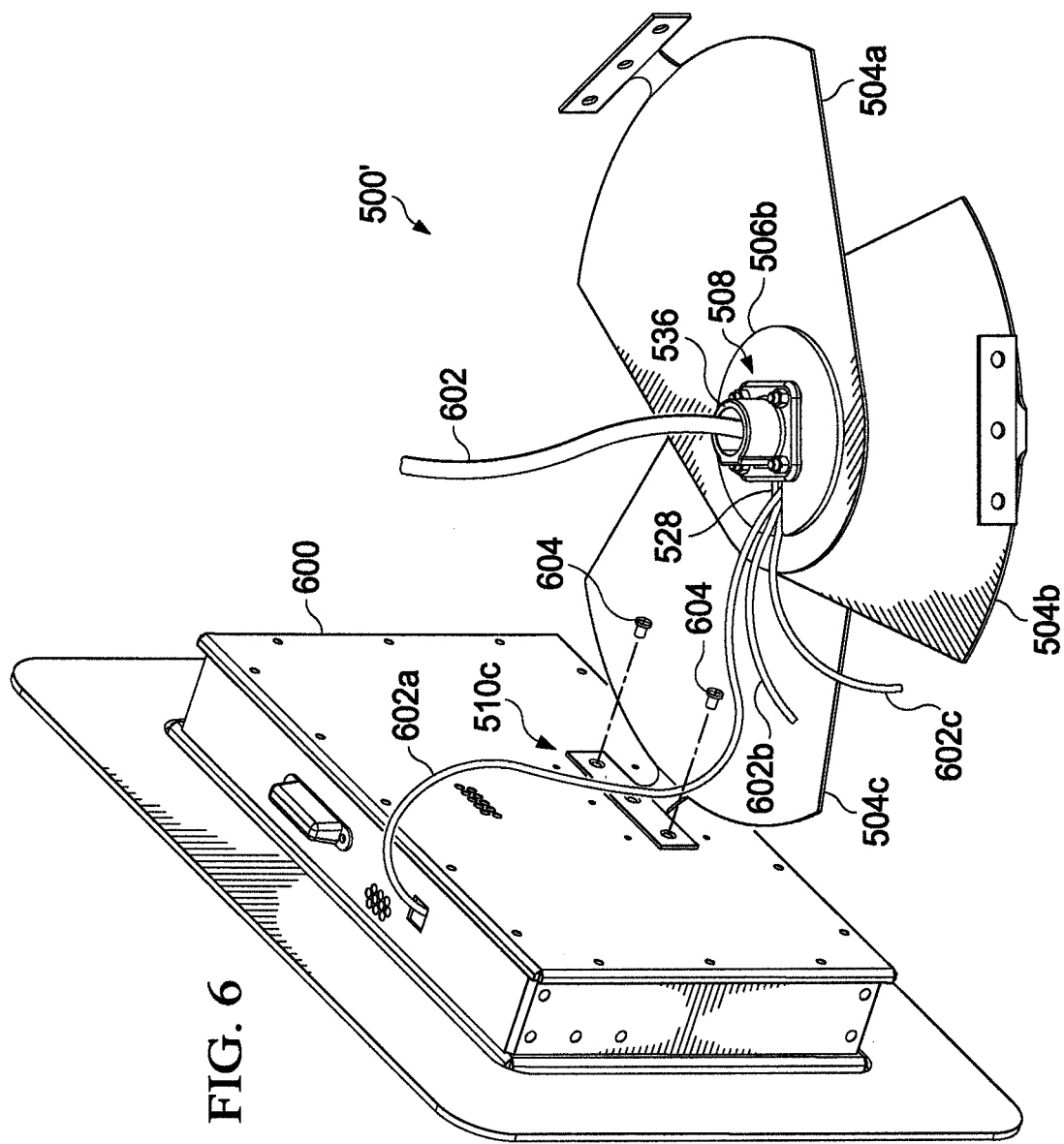
FIG. 6 is an illustration of an assembled view of the multi-view display fixture assembly of FIG. 5 with one electronic display being supported thereby.

With regard to FIG. 6, an illustration of an assembled view of the multi-view display fixture assembly 500' of FIG. 5 with one electronic display 600 being supported thereby is shown. An electrical conductor 602, which would extend through the support extension member 502 (FIG. 5), if shown, passes through the flange 536 of the clamp bracket 508. The electrical conductor 602 is shown to pass through the channel 528 of the clamp plate 506b and be separated into three electrical conductors 602a-602c. Actually, each of the electrical conductors 602a-602c may include two electrical conductors, a ground line and a positive voltage line, and include a connector that plugs into a jack or otherwise at the electronic display 600. Alternative voltage levels may be utilized in accordance with the principles of the present invention. Voltage signals being conducted by the electrical conductors 602a-602c may be direct current (DC) or alternating current (AC) signals. In one embodiment, if data signals are to be communicated via wire, as opposed to using wireless communications, to the electronic display 600, four electrical conductors may be utilized for the electrical conductor 602a, whereby two power conductors and two or more signal conductors are included. The electrical conductors 602a-602c may be standard or proprietary electrical conductors.

Figure 7:
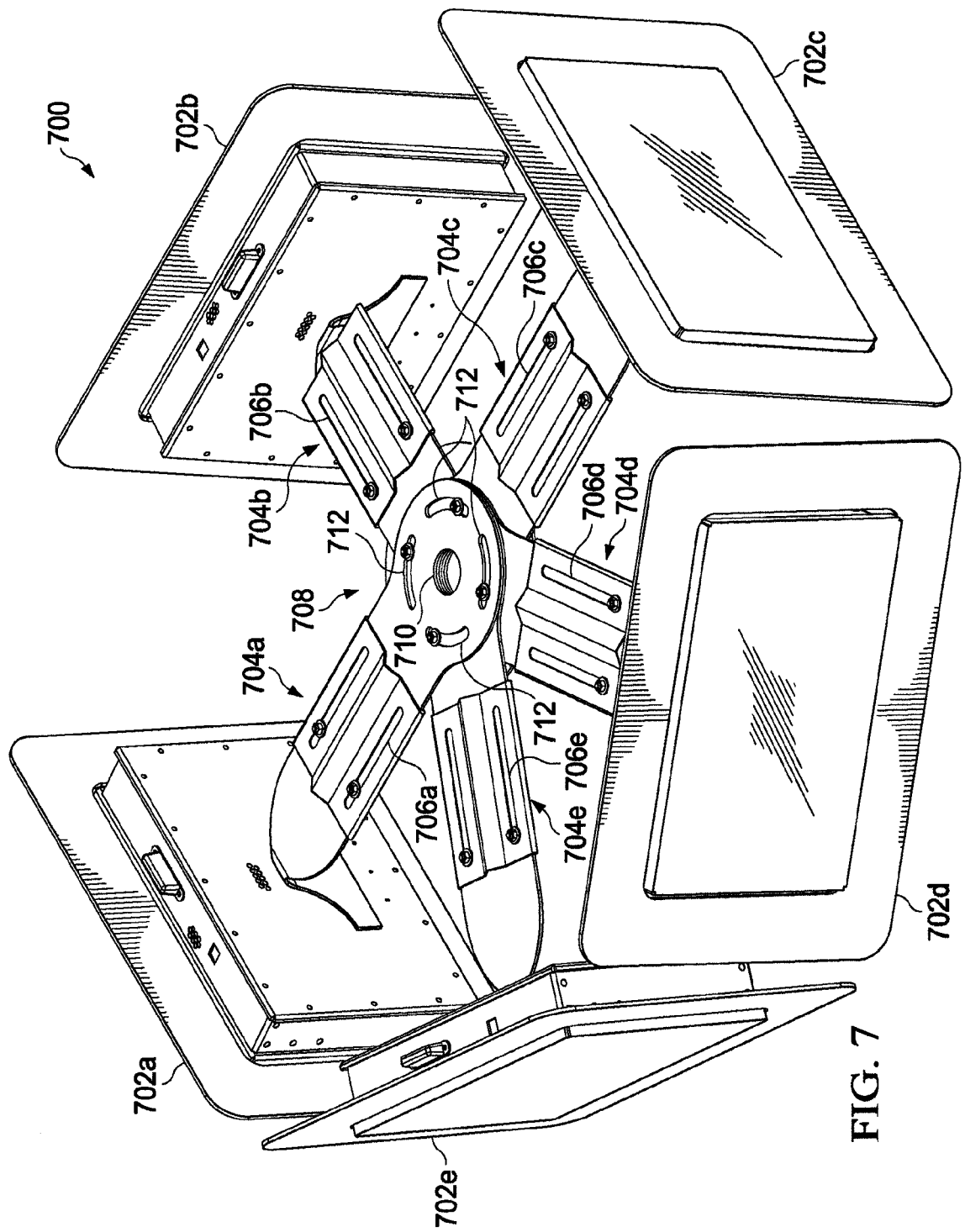
FIG. 7 is an illustration of an alternative illustrative multi-view display cluster.

With regard to FIG. 7, an illustration of an alternative illustrative multi-view display cluster 700 is shown. The multi-view display cluster 700 includes five electronic displays 702a-702e (collectively 702) that are mounted to and supported by individual adjustable spoke mounts or extension arms 704a-704e (collectively 704) that are adjustable in both length and angular position. As shown, the extension arms 704 may each include one or more slides 706a-706e to allow for the extension arms 704 to be adjusted radially inward and outward. Hub portions 708 of the extension arms 704 may be stacked on one another, where each hub portion may include an opening 710 through which an support extension member (not shown) may extend. To provide for angular rotation about the support extension member, one or more angular slots 712 may be defined by the hub portions 708. In an alternative embodiment, the hub portion 712 may be configured similar to the representation in FIG. 5.

By providing for adjustable angular rotation and length of the extension arms 704, the multi-view display cluster 700 may enable different sized electronic displays 702 to be utilized on the multi-view display cluster 700. For example, if smaller electronic displays 702 are utilized, the radial extension of the extension arms 704 may be shorter than if larger electronic displays 702 are utilized simply because less angular distance is needed to prevent the electronic displays from contacting one another. By providing for angular adjustment, the electronic displays may be oriented to face arbitrary directions to maximize the ability for shoppers to view an electronic display as the shoppers travel within wander areas. Providing for repositioning of the electronic displays on the fixture further accommodates for store layout changes. It should be understood that the principles of the present invention also provide for fixed length and/or angles of the extension arms that are uniform or non-uniform.

Power Outlet Box

Figure 8A:
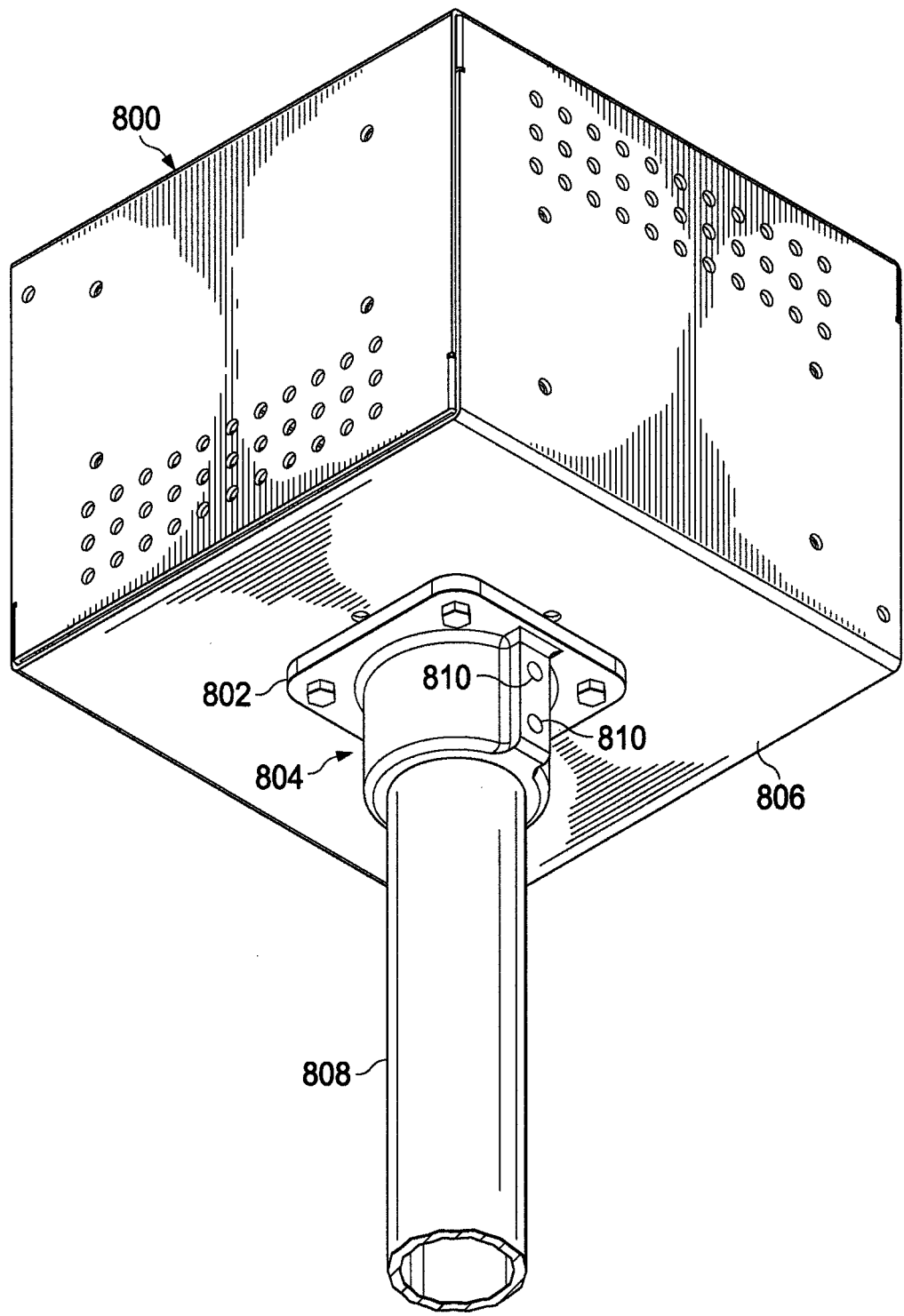
FIGS. 8A-8E is an illustration of an illustrative power outlet box configured to house a power supply for powering electronic displays on a multi-view display cluster.

With regard to FIG. 8A, an illustrative power outlet box 800 configured to house a power supply (not shown) for powering electronic displays on a multi-view display cluster. Because of retail store fire code regulations, power supplies are required to be positioned below the ceiling, thereby enabling a problem or fire to be identified faster than if the power supply were positioned above the suspended ceiling. If retail store regulations change, however, it should be understood that the power outlet box 800 may be configured to enable positioning above the suspended ceiling.

The power outlet box 800 may have a support bracket 802 that includes a flange 804 connected thereto. The support bracket 802 may attach to a lower surface 806 of the power outlet box 800 and be configured to support a support extension member 808, such as a pole, that extends downward for supporting a multi-view display fixture assembly, such as shown in FIGS. 5 and 6. In supporting the support extension member 808, fastening members 810 may be utilized to extend through openings (not shown) in the support extension member 808. Alternative configurations may be utilized to secure the support extension member 808 to the support bracket 802.

As described with regard to FIGS. 2A and 2B, the power outlet box 800 may be adapted to be connected to and supported by the electrical box 210. While the power outlet box 800 is shown as a cube or rectangular cube, it should be understood that any other geometric configuration may be utilized in accordance with the principles of the present invention.

Figure 8B:
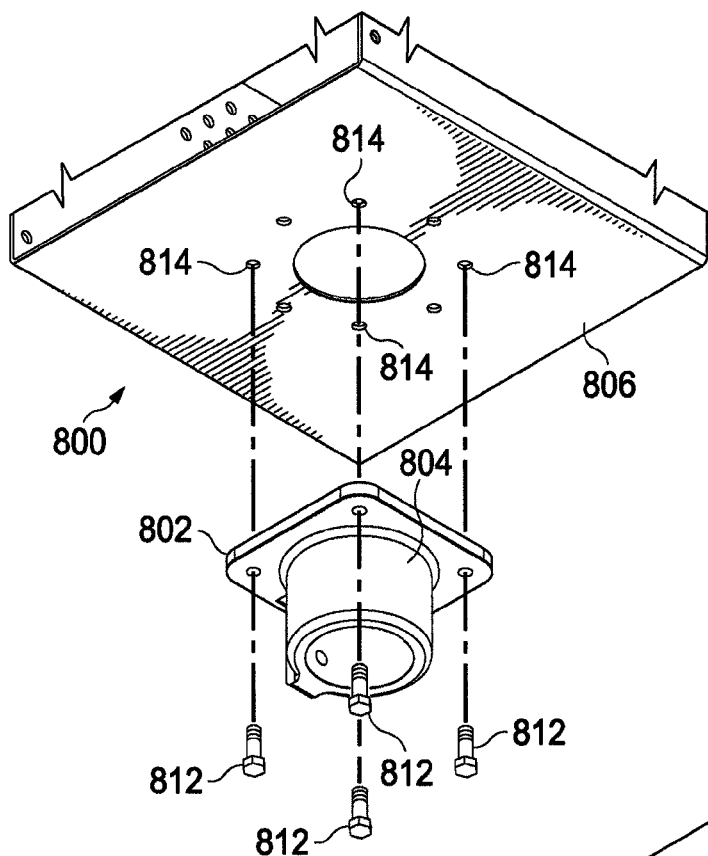

With regard to FIG. 8B, the support bracket 802 is shown to be separated from the power outlet box 800 and four fastening members 812, such as bolts, are shown to be aligned to extend through openings in a support bracket 802 and openings 814 defined by the bottom surface 806 of the power outlet box 800. The fastening members 812 are utilized to secure the support bracket 802 to the power outlet box, as shown in FIG. 5A.

Figure 8C:
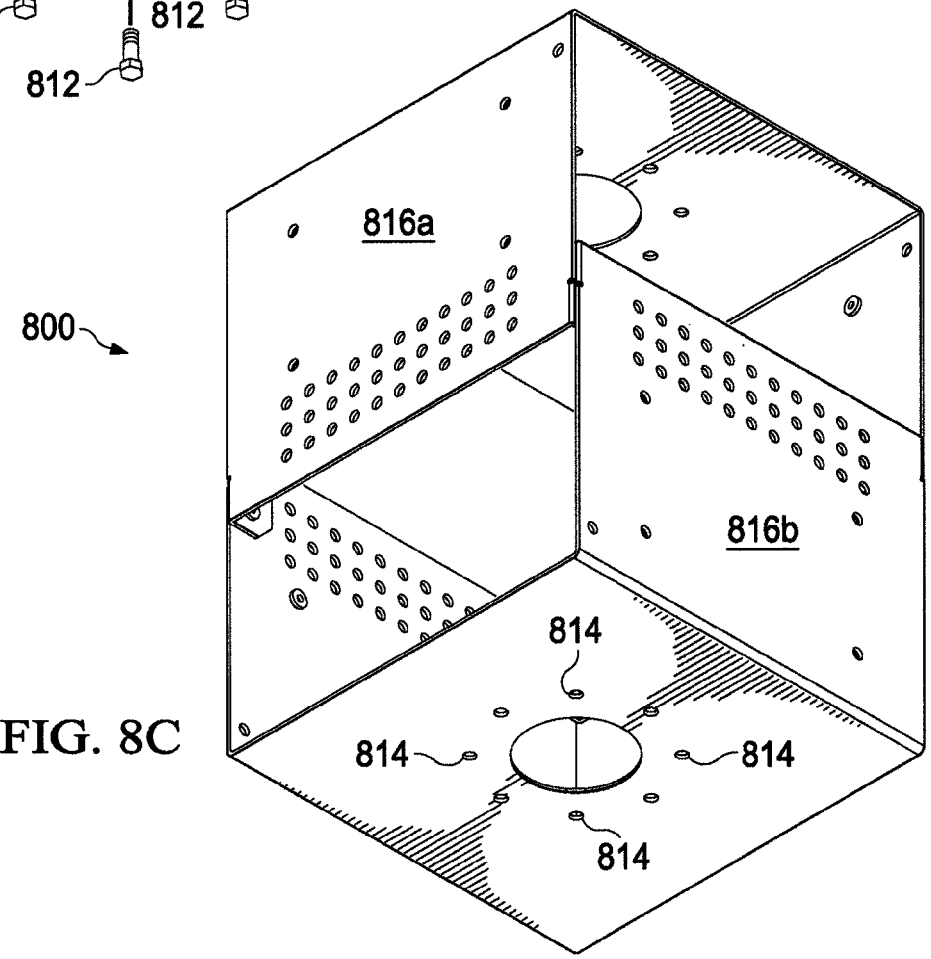

With regard to FIG. 8C, the power outlet box 800 is shown to have two portions, an upper box portion 816a and a lower box portion 816b (collectively 816). In one embodiment, the two box portions 816 are identical and rotated 90 degrees from one another such that the two box portions 816 mate with one another. By having identical shapes, production costs are reduced. Within the box may be a power supply (not shown) that receives AC power and converts the AC power into DC power (e.g., 120 VAC to 12 VDC) for delivery to the electronic displays on the multi-view display cluster. In an alternative embodiment, the power supply may down-convert high voltage AC to low voltage AC power (e.g., 120 VAC to 12 VAC). In one embodiment, a terminal block (not shown) may be housed in the power outlet box 800. The terminal block may include three or more pair of terminals for supplying power to the three or more electronic displays. Conductor wire pairs, not shown, may be connected to the terminal block and extended through the support extension member 808 (FIG. 8A). It should be understood that alternative electrical configurations may be utilized to power the electronic devices.

Figure 8D:
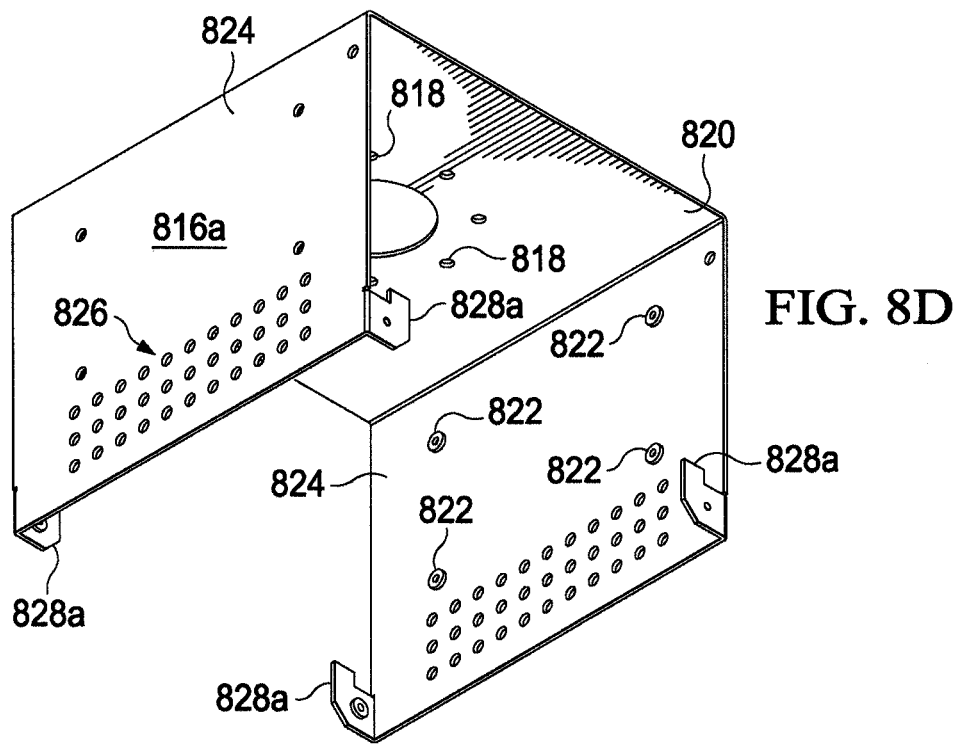

With regard to FIG. 8D, the upper box portion 816a of the power outlet box 800 is shown to include mounting holes 818 defined by a top surface 820 of the upper box portion 816a. The mounting holes 818 are adapted to enable attachment to an electrical box (see FIGS. 2A and 2B) within a suspended ceiling to which the power outlet box 800 being attached or otherwise adjoining. Power supply mounting holes 822 are shown to be defined by a sidewall 824 of the upper box portion 816a to enable a power supply (not shown) to be mounted thereto. Air holes 826 may also be provided along the side walls 824 of the upper box portion 816a to provide ventilation for the power supply.

The upper box portion 816a may further include interlock tabs 828a that are angled upward such that when identical interlock tabs 828b on the lower box portion 816b (FIG. 8E) of the power outlet box 800 mates with the interlock tabs 828a of the upper box portion 816a, the interlock tabs 828a of the upper box portion 816a support the interlock tabs 828b of the lower box portion 816b. This interlocking of the interlock tabs 828a and 828b enables someone who is installing or repairing the power outlet box 800 to have the upper box portion 816a support the lower box portion 816b, thereby making it easier for installation and maintenance technicians to access components as the power outlet box 800 does not have to be completely taken apart. Alternative configurations to provide easy access to the inside of the power outlet box 800 may be utilized, as well. However, the configuration shown herein uses minimal components, which makes production and installation costs particularly low.

Figure 8E:
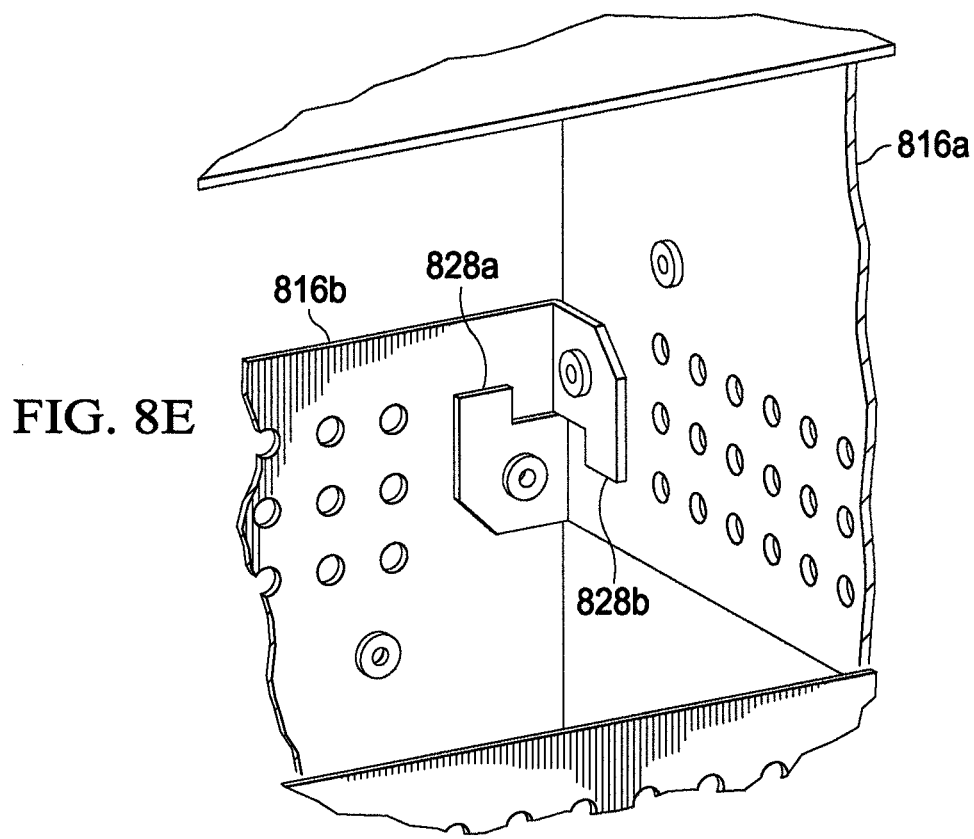

With regard to FIG. 8E, a close up illustration of interlock box tabs 828a and 828b of the upper and lower box portions 816a and 816b, respectively, of the power outlet box 800 are shown to interlock with one another. The interlocking of the interlock box tabs 828a and 828b allows the lower box portion 816b to be supported by the upper portion 828a of the power outlet box 800 during installation and maintenance of the power outlet box 800. It should be understood that alternative configurations of the interlock box tabs may be utilized to provide the same or similar functionality in accordance with the principles of the present invention. It should further be understood that configurations that use alternative mechanisms (e.g., hinged door) for one portion of the power outlet box to gravitationally support another portion of the power outlet box and provide the ability for a user to work within the power outlet box without having to remove one of the portions are contemplated in accordance with the principles of the present invention.

Figure 9:
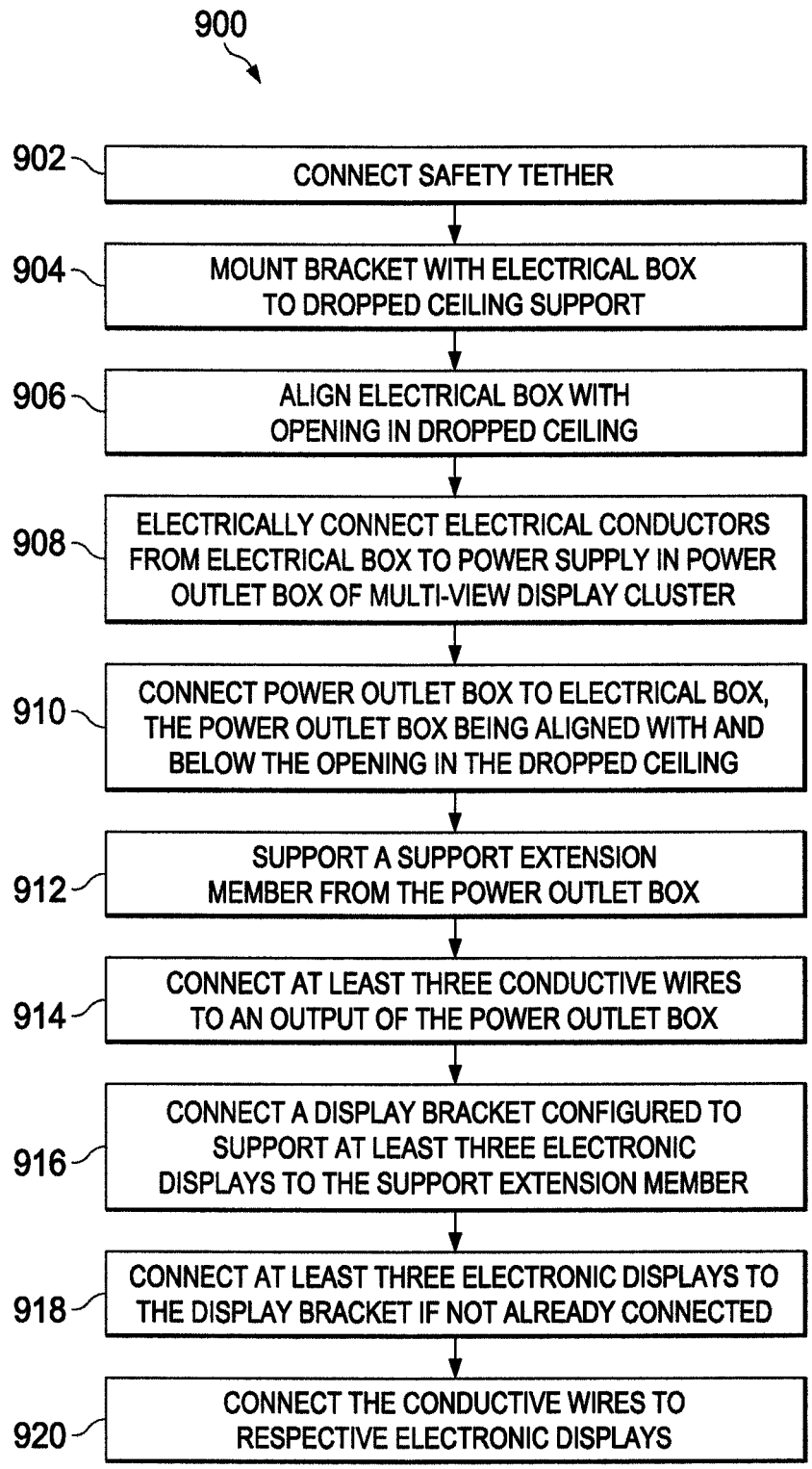
FIG. 9 is a flow diagram of an illustrative process for installing a multi-view display cluster in a retail environment.

With regard to FIG. 9, a flow diagram of an illustrative process 900 for installing a multi-view display cluster in a retail store is shown. The process 900 may start at step 902, where a safety tether may be connected to a joist that supports a ceiling or roof of a building. A bracket connected to the safety tether may be mounted to or otherwise supported by a suspended or suspended ceiling support at step 904. At step 906, an electrical box that is connected to the bracket may be aligned with an opening in a suspended ceiling, such as in a suspended ceiling file. If an opening does not already exist, an installer may create an opening through which the electrical box may extend. At step 908, electrical conductors from the electrical box may be electrically connected to a power supply in a power outlet box of a multi-view display cluster. The electrical conductors may be connected to an electrical header, as understood in the art, or directly to the power supply.

At step 910, the power outlet box may be connected to the electrical box. The power outlet box may be aligned with and below the opening in the suspended ceiling. A support extension member may be supported from the power outlet box at step 912. The support extension member may be a tube that enables at least three electrical conductors, such as pairs of conductive wires, to be extended therethrough. It should be understood that the electrical conductors may be incorporated into a single sleeve. At step 914, the electrical conductors may be connected to an output of the power outlet box, where the output may be a header block. At step 916, a display bracket configured to support at least three electronic displays may be connected to the support extension member. The display bracket may include at least three extension arms that are independently positionable, such as being rotatable, about the support extension member. At step 918, at least three electronic displays may be connected to the display bracket if not already connected. The electronic displays may be connected to mounting structures at the ends of the extension arms. At step 920, the conductive wires may be connected to respective electronic displays.

Although shown as drawing power from above a suspended ceiling, the principles of the present invention are not limited to supporting the multi-view display cluster from a suspended ceiling. Alternative embodiments may provide for pedestals, wall extenders, arms, pole mounts, or any other support members to be utilized to support and deliver power to the electronic displays. Furthermore, rather than using individual spokes or extension arms, a ring or any other geometric shape structure (e.g., octagon) may be utilized to support the electronic displays and provide for individually adjustable angular, azimuth, and/or elevation orientation of the electronic displays. For example, if a fixed structure (e.g., ring) is used, brackets that connect the electronic displays to the structure may provide for both azimuth and elevation adjustment of the electronic displays to accommodate for different environments in which the electronic displays are utilized. Various bracket mechanisms that prevent removal or tampering of the electronic displays.

Figure 10:
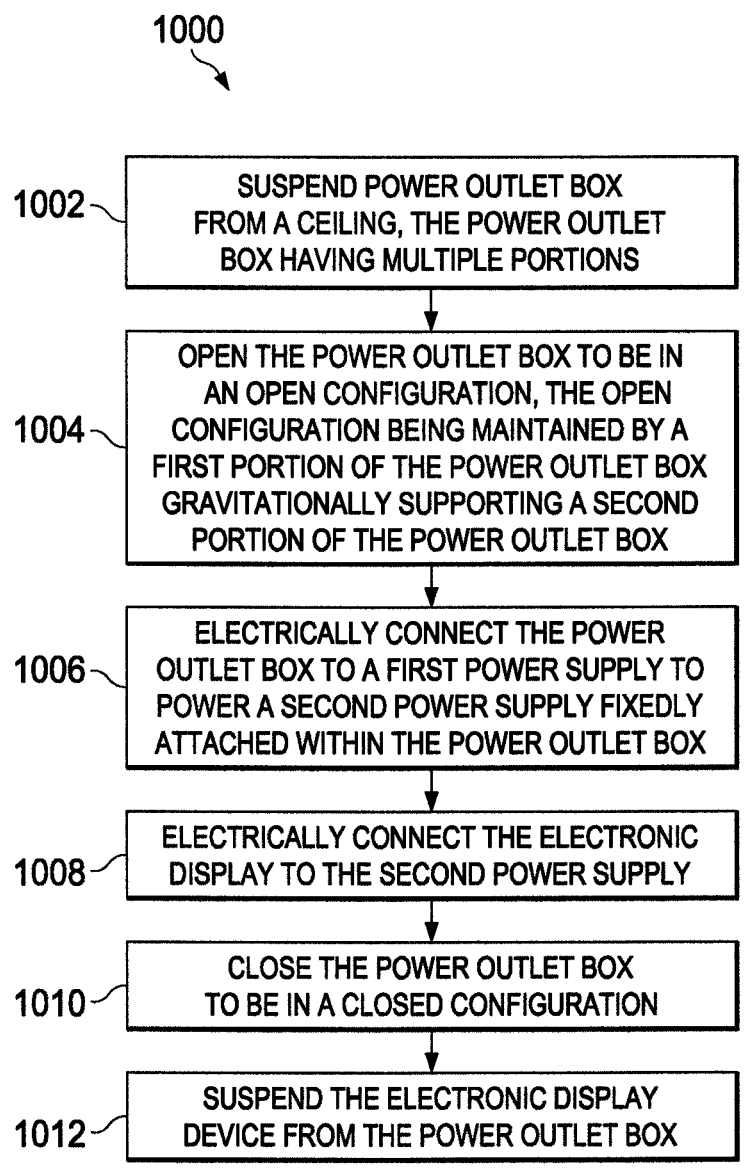
FIG. 10 is a flow diagram of an illustrative process for installing a power outlet box for powering an electronic display device being suspended from the power outlet box.

With regard to FIG. 10, a flow diagram of an illustrative process 1000 for installing a power outlet box for powering an electronic display device being suspended from the power outlet box is shown. The process 1000 may start at step 1002, where the power outlet box may be suspended from a ceiling. The power outlet box may have multiple portion that are vertically aligned. At step 1004, the power outlet box may be opened to be in an open configuration. In the open configuration, a first portion of the power outlet box may gravitationally support a second portion of the power outlet box so as to enable a user to work within the power outlet box. At step 1006, the power outlet box may be electrically connected to a power source to power a power supply fixedly attached within the power outlet box. At step 1008, the electronic display may be electrically connected to the power supply. In electrically connecting, there may be a direct or indirect connection via another electrical component, such as an electrical header. At step 1010, the power outlet box may be closed to be in a closed configuration. The closed configuration may utilize fastening hardware, such as screws, to maintain the multiple portions of the power outlet box together. At step 1012, the electronic display device may be suspended from the power outlet box. In one embodiment, multiple electronic display devices may be suspended, where each of the electronic displays may be independently positionable about a support extension member being suspended from power outlet box. It should be understood that being suspended includes being directly or indirectly suspended from the power outlet box.

Media Metrics

With further reference to FIG. 4, the multi-view display clusters 408 are used to improve the ability for an electronic display network, including the electronic displays 418 in the aisles 402 and electronic displays 410 in the wander area 404, that is configured to display content and deliver and audience in the wander area 404, as described in co-pending U.S. patent application Ser. No. 12/368,232. The network provides for reach and frequency of view in the retail environment 400 that results in media metrics that are substantially the same or backwardly compatible as those on traditional television. When the network of electronic displays is displaying content substantially simultaneously, substantially every shopper that enters the retail store is reached by each advertisement when the network of electronic displays is properly laid out consistent with the teachings described in the Ser. No. 12/368,232 patent application. As a result, the network of the electronic displays 418 and 410 generally has the ability to reach each of the shoppers throughout each of the shopping areas of the retail store, including the wander areas. In order to effectuate reaching the shopping audience and provide frequency of view of advertisements and messages in the wander areas, the electronic displays in the multi-view display clusters are sized and positioned based on resolution, viewing distance, directions of travel toward a product display, screen, or zone of activity, viewing angles of the individual electronic displays, and any other parameters that allow for shoppers to have the ability to view at least one electronic display while shopping in the wander areas. By configuring the electronic displays with these parameters, the devices become passively visible to shoppers, which enables the shoppers to view an electronic display without having to actively turn their head or attention to view the content being displayed thereon (i.e., the electronic displays can be seen in their line-of-sight either directly or in their peripheral vision when looking substantially forward in the direction of travel).

As an example of positioning (i) the multi-view display cluster(s) 408 in a wander area 404 and (ii) the electronic displays 410 in the multi-view display cluster(s) 408 in the wander area 404, if it is determined that a certain percentage of shoppers who travel through a wander area travel in certain shopping paths 416 (e.g., 62% of shoppers in the wander area 404 travel to the banana display directly from the grapes display, 25% of shoppers in the wander area travel to the banana display directly from the lettuce display, and the remaining 13% of shoppers in the wander area 404 travel to the banana display directly from the pepper display), then the electronic displays 410 in the multi-view display cluster 408a positioned above the banana display 406 may be positioned to face the paths from which shoppers primarily travel to the banana display 406 (i.e., from the grapes, lettuce, and pepper displays) and the percentage of shoppers following this path toward the bananas (or zone in which the multi-view display cluster 408a is positioned) as compared to all shoppers who shop at the grocery store can be determined to have had the opportunity to view a certain number of advertisements or messages while in this location of the wander area 404. It should be understood that the larger the wander area, the more multi-view display clusters may be used to ensure that the media metrics are satisfied as distance and angle factors are to be satisfied to ensure that substantially each shopper has an opportunity to view an electronic display while traversing through the wander area Audience delivery may be determined by aggregating the number of shoppers that are in the wander area 404 over a given period of time In measuring the audience, the principle of the present invention may utilize shopper measurement and reporting techniques as described in co-pending U.S. patent application Ser. Nos. 12/848,852 filed Aug. 2, 2010; 12/848,861 filed Aug. 2, 2010; and 13/052,946 filed Mar. 21, 2011, the entire contents of which are hereby incorporated by reference.

While reaching every shopper may be ideal, a lesser percentage, such as 95%, may be acceptable. It should be understood that the overall reach to the shopping audience and frequency of view of advertisements and messages by the shopping audience is enhanced by having the electronic display clusters in the wander area 404 in addition to in the electronic displays in the aisles. If the multi-view display clusters were not positioned in the wander areas, then there would be time lapses of audience viewership, thereby losing the ability to claim delivery of the shopping audience and frequency of view while the shoppers shop in the wander areas not so equipped.

Media metrics may be generated in a retail environment by arranging multiple electronic displays along aisles of a retail environment, and arranging at least one multi-view electronic display cluster including at least three electronic displays in at least one wander area of the retail environment. The electronic displays arranged along the aisles and wander area may be arranged to present a shopper during a shopping trip in the retail environment with each message among multiple repeating messages displayed substantially simultaneously (within a few milliseconds) on the electronic displays a predicted number of multiple times. The predicted number of multiple times may be three. Arranging the electronic displays in the aisles and electronic displays of the multi-view electronic display cluster may include arranging the electronic displays at substantially the same height above a floor of the retail environment.

While the use of a multi-view electronic display clusters reduces manufacturing and installation costs, it should be understood that alternative configurations of fixtures, including a single or double electronic display per fixture, that extend from the ceiling may be utilized. In using such a configuration, multiple fixtures including electronic display (s) may be arranged in a similar manner as provided by the multi-view electronic display clusters. In other words, media metrics that are achieved using multi-view display clusters may be achieved using alternative configurations and are contemplated by the principles of the present invention.

The previous description is of a preferred embodiment for implementing the invention, and the scope of the invention should not necessarily be limited by this description. The scope of the present invention is instead defined by the following claims.

What is claimed:

1. A power outlet box for housing electronics and powering electronic displays suspended in a retail environment, said power outlet box comprising:
 a first housing portion including a first set of vertical support features and a second set of vertical support features;
 a second housing portion including a third set of vertical support features and a fourth set of vertical support features, the power outlet box having (i) a closed configuration when the first and third sets of vertical support features are aligned and (ii) an open configuration when the second and fourth set of vertical support features are in contact with one another, the second set of vertical support features being adapted support the fourth set of vertical support features when the power outlet box is in the open configuration; and a power supply device fixedly positioned within the power outlet box when in the closed configuration.

2. The power outlet box according to claim 1, wherein said first housing portion includes two side members and a base member spanning between the same edge of the two side members of said first housing portion;

wherein said second housing portion includes two side members and a base member spanning between the same edge of the two side members of said second housing portion, the two side members of said first and second housing portions being approximately the same size, and the base members of said first and second housing portions being approximately the same size; and wherein said first and second housing portions, when configured to form the power outlet box, have the respective base members facing one another and the respective side members having edges touching one another, thereby forming the power outlet box.

3. The power outlet box according to claim 2, wherein the base member of said second housing portion includes a primary opening, and a set of secondary openings disposed about the primary opening and configured to enable a fastening members to be inserted therethrough.

4. The power outlet box according to claim 3, further comprising a coupling member configured to be fixedly secured to the base member of said second housing portion via the set of secondary openings, said coupling member defining an opening extending longitudinally therethrough, that when aligned with the primary opening of said second housing portion, (i) enables electrical conductors to pass therethrough and (ii) enables a support extension member to be supported by said coupling member and suspended from said second housing portion.

5. The power outlet box according to claim 1, wherein the first and third sets of vertical support features are openings defined by the first and second housing portions and adapted for fastening members to be inserted therethrough to prevent relative movement between the first and second housing portions.

6. The power outlet box according to claim 1, wherein the second and fourth vertical support features are tabs that interlock when in the open configuration, thereby causing said first housing portion to support said second housing portion via the respective tabs.

7. The power outlet box according to claim 1, wherein at least one of said first housing members is configured to have a power supply device fixedly attached thereto.

8. A method for installing a power outlet box for powering an electronic display device being suspended from the power outlet box, said method comprising:

suspending the power outlet box from a ceiling, the power outlet box having multiple portions;

opening the power outlet box to be in an open configuration, the open configuration being maintained by a first portion of the power outlet box gravitationally supporting a second portion of the power outlet box so as to enable a user to work within the power outlet box;

electrically connecting the power outlet box to a power source to power a power supply fixedly attached within the power outlet box;

electrically connecting the electronic display to the power supply;

closing the power outlet box to be in a closed configuration; and suspending the electronic display device from the power outlet box.

9. The method according to claim 8, wherein suspending the electronic display includes connecting a support clamp to the second portion of the power outlet box and connecting an extension member to the support clamp.

10. The method according to claim 9, wherein suspending the power outlet box from the ceiling includes:

mounting a bracket to support channels of the ceiling and securing the bracket with a chain to the support channels; and suspending the power outlet box from the bracket.

11. The method according to claim 8, further comprising forming an opening in a ceiling member to enable the support extension member to extend through the ceiling member.

12. The method according to claim 9, wherein suspending the electronic display device includes suspending an extension arm from the extension member.

13. The method according to claim 12, wherein suspending the extension arm includes suspending a first extension arm clamp plate from the extension member above the extension arm and a second extension arm clamp plate from the extension member below the extension arm.

14. The method according to claim 13, wherein suspending the first and second extension arm clamp plates further includes connecting an extension arm clamp bracket to the extension member, and connecting the extension arm clamp bracket to the second extension arm clamp plate.

15. The method according to claim 14, further comprising rotating the extension arm about the extension member to position the electronic display to face a desired direction.

16. The method according to claim 8, wherein suspending the electronic display device further includes longitudinally adjusting position of the electronic display device with respect to the position of the power outlet box.

\* \* \* \* \*